United States Patent
Kroencke et al.

(10) Patent No.: US 9,168,888 B2
(45) Date of Patent: Oct. 27, 2015

(54) DEVICE FOR LOCKING AND UNLOCKING A BELT HEIGHT ADJUSTMENT DEVICE AND VEHICLE SEAT

(71) Applicant: ISRINGHAUSEN GmbH & Co. KG, Lemgo, DE (US)

(72) Inventors: Reiner Kroencke, Hohnhorst (DE); Austin Jennings, Bielefeld (DE)

(73) Assignee: ISRINGHAUSEN GMBH & CO. KG, Lemgo (DE)

( * ) Notice: Subject to any disclaimer, the term of this patent is extended or adjusted under 35 U.S.C. 154(b) by 119 days.

(21) Appl. No.: 14/024,195

(22) Filed: Sep. 11, 2013

(65) Prior Publication Data

US 2014/0097663 A1    Apr. 10, 2014

(30) Foreign Application Priority Data

Sep. 12, 2012   (DE) .......................... 10 2012 017 954

(51) Int. Cl.
*B60R 22/26* (2006.01)
*B60R 22/20* (2006.01)
*B60N 2/68* (2006.01)

(52) U.S. Cl.
CPC ............... *B60R 22/26* (2013.01); *B60N 2/688* (2013.01); *B60R 22/20* (2013.01); *B60R 2022/263* (2013.01)

(58) Field of Classification Search
CPC .... B60R 22/20; B60R 22/201; B60R 22/202; B60R 22/203; B60R 22/206; B60R 22/26
USPC .......................................... 297/468, 483, 486
See application file for complete search history.

(56) References Cited

U.S. PATENT DOCUMENTS

| | | | | |
|---|---|---|---|---|
| 3,964,798 A * | 6/1976 | Burleigh | .......................... | 384/37 |
| 4,225,184 A * | 9/1980 | Strowick | ....................... | 297/468 |
| 4,522,426 A * | 6/1985 | Weman | ....................... | 280/801.2 |
| 4,790,597 A * | 12/1988 | Bauer et al. | .................... | 297/468 |
| 5,722,731 A * | 3/1998 | Chang | .......................... | 297/473 |
| 6,322,140 B1* | 11/2001 | Jessup et al. | ............. | 297/216.17 |
| 6,572,065 B2* | 6/2003 | Koga et al. | .................... | 248/421 |
| 7,021,662 B2* | 4/2006 | Hoffmann et al. | ......... | 280/801.2 |
| 2002/0167213 A1* | 11/2002 | Warner et al. | ................. | 297/483 |
| 2005/0134099 A1* | 6/2005 | Masutani | .................... | 297/216.1 |
| 2006/0061176 A1* | 3/2006 | Sakai et al. | .............. | 297/344.15 |
| 2007/0126277 A1* | 6/2007 | Musale | .......................... | 297/464 |
| 2007/0170769 A1* | 7/2007 | Beneker et al. | ............... | 297/468 |
| 2009/0322141 A1* | 12/2009 | Matsushita | .................. | 297/483 |
| 2014/0097663 A1* | 4/2014 | Kroencke et al. | ............. | 297/468 |

FOREIGN PATENT DOCUMENTS

DE   20 2010 012 472 U1   12/2010

* cited by examiner

*Primary Examiner* — David R Dunn
*Assistant Examiner* — Timothy J Brindley
(74) *Attorney, Agent, or Firm* — Abelman, Frayne & Schwab

(57) ABSTRACT

The invention relates to a belt height adjustment device for fixed connection to a bearing structure (1) of a vehicle seat, having a lever (2) and a belt deflection fitting (3) which is rotatably movable relative thereto. The lever (2) is pivotably connected to the bearing structure (1) to provide an axis of rotation. The lever (2) further includes a fixing device which can be fixed with respect to its pivotal movement relative to the bearing structure (1). The fixing device is configured to prevent the pivoting of the lever (2) relative to the bearing structure (1), and in particular, in the downward direction, and is configured to engage automatically in prespecified lever angle positions on an upward movement of the lever (2).

10 Claims, 5 Drawing Sheets

DEVICE FOR LOCKING AND UNLOCKING A BELT HEIGHT ADJUSTMENT DEVICE AND VEHICLE SEAT

BACKGROUND OF THE INVENTION

1. Field of Invention

The invention relates to a belt height adjustment device for fixed connection to a bearing structure of a vehicle seat for the seats of commercial vehicles having a lever and a belt deflection fitting which is rotatably movable relative thereto.

2. Description of the Related Art

To increase the wearing comfort of a safety belt with vehicle seats having integrated belts, seats of this kind are known to have devices for making individual adjustments or changes to the position of the upper point of the belt. Here, the upper outlet point of the belt strap can be adjusted to the size and other physical features of the occupant. In the case of a large occupant, therefore, it is desirable for the upper outlet point to be higher than with a smaller occupant. In addition, it is also advantageous for the angle of the outlet slot relative to the horizontal to be individually adjustable to match the respective occupant. This problem is further intensified in the case of seats in commercial vehicles since these are regularly equipped with a pneumatic or mechanically elastic vibration system. The fixed attachment of the upper belt deflector to the B-pillar is undesirable for reasons of comfort so that for vehicle seats of this kind, in principle, the only belt systems considered are those attached to the vehicle seat.

With the known devices of this kind, there is a need to improve the handling for adjustment and operation.

A belt height adjustment device for fixed connection to a bearing structure of a vehicle seat is known from DE 20 2010 012 742 U1. The device has a lever and a belt outlet part which is movable relative thereto.

A disadvantage of the device in DE 20 2010 012 472 U1 is the operation of the height adjustment. To initiate the adjustment process, the user must first actively disable the latching mechanism. To do this, it is necessary to pull the corresponding lever against a spring force in order to move a latching pin out of an assigned latching recess. Only then can the actual adjusting process, in which the lever and hence the upper belt point arranged at its free end are rotated about a pivot point located in the region of the upper backrest of the vehicle seat, take place. In addition, the pulling force on the lever has to be maintained during the entire adjustment process. In particular, when the position of the upper belt point is to be changed by more than one latching step, this is not optimal with respect to comfort criteria.

Therefore, it is the object of the invention to present a belt height adjustment device which is simple to operate and which is also characterised by a simple technical design and a low number of parts.

SUMMARY OF THE INVENTION

This object is achieved by a belt height adjustment device for fixed connection to a bearing structure of a vehicle seat having a lever and a belt deflection fitting which is rotatably movable relative thereto, wherein the lever has an axis of rotation by means of which it is pivotably connected to the bearing structure, wherein the lever furthermore has a fixing device by means of which it can be fixed with respect to its pivotal movement relative to the bearing structure. The fixing device is designed to prevent the pivoting of the lever relative to the bearing structure in particular in the downward direction, wherein the fixing device is further designed to engage automatically in prespecified lever angle positions on an upward movement of the lever, wherein, on an further upward movement, the fixing device of the lever can be deactivated when the upper fixing position is exceeded and the lever may be brought into its lower structurally d prespecified position without remaining in fixing positions, wherein the fixing device is formed from a latch and a toothed segment and the first freewheeling corner of the latch is designed to lie spring-loaded on a freewheeling curve of the toothed segment and to travel along said curve on a rotation of the lever and the fixing device can be activated on a subsequent upward movement of the lever and prevents a downward movement of the lever.

A downward change to the height position of the belt deflection fitting is initially not possible. However, the belt deflection fitting can be brought into a higher position by rotating the lever. As a result of the upward movement, the lever is brought into engagement along defined lever angle positions.

The lever angle position describes defined angles which the lever is able to adopt during its rotation about the axis of rotation on the respective engagement.

If, after reaching the highest latching position, the lever rotates further in the same direction, the height position of the belt deflection fitting can be lowered, i.e. changed downward. During this, the lever is brought, without remaining in fixing positions, into its lower structurally predetermined starting position, which simultaneously represents the lower use position.

In the present case, the bearing structure of the vehicle seat corresponds to the back frame of the vehicle seat. This back frame can, as shown in FIG. 1, consist of a lower base part and an upper part which is rotatably connected to the base part and hence include a so-called shoulder adjustment. However, the back frame can also be embodied as one piece, i.e. without the function of a shoulder adjustment.

All the components used are preferably made of durable, rigid and low-torsion materials, such as, for example, metals, the alloys thereof etc.

The simple mechanics provide a belt height adjustment device permitting reliable and easy-to-operate belt adjustment.

An advantageous development of the invention envisages that, with the fixing device, which is formed from a latch and a toothed segment, the latch engages in assigned latching recesses of the toothed segment with spring force loading by means of a latching lug which is moulded-on in one piece. An embodiment of this kind provides the possibility of guiding the latch optimally along the toothed segment, wherein the latching lug latches into assigned latching recesses of the toothed segment according to the position desired by the occupant and also remains latched therein due to the spring-force loading.

A further advantageous development of the invention envisages that the lever is connected via a fitting which is firmly connected to the bearing structure, and which functions as a holding element for a stop screw, wherein the lever is fixed in position by means of the stop screw relative to the fitting and fixed rotatably thereto. The use of a stop screw is a very simple possibility for obtaining a torque-free connection to the fitting.

The fitting itself is preferably connected to the bearing structure by means of a welded, rivet or screwed connection.

A further advantageous development of the invention envisages that the lever is designed as a self-supporting structure and consists of a substantially C-shaped profile which is enclosed on three sides with moulded-on radii which is supplemented by a cover to form an enclosed profile. Here, the moulded-on radii of the profile are i.a. positioned and dimensioned such that the applicable requirements with respect to a head-impact test are met. These requirements are known to a person skilled in the art and so will not be described in detail. The profile and the cover are preferably joined by a welded connection, but other methods of connection known to a person skilled in the art from the state of the art, such as, for example, a screwed connection, are possible.

A further advantageous development of the invention envisages positioning the cover of the lever on the side of the lever facing against the direction of travel, while on the other hand, the substantially C-shaped profile is closed in the direction of travel.

A further advantageous development of the invention envisages that the swivel axis of the lever defined by the centre axis of the stop screw is embodied at a first end of the lever and the belt deflection fitting is embodied at a second end of the lever. The lever is fastened rotatably to its first end on the bearing structure. The belt deflection fitting is attached to its second end. The second end of the lever protrudes over the bearing structure of the frame of the backrest in order to facilitate advantageous belt guidance.

A further advantageous development of the invention envisages that a guide plate on the lever is arranged in a fixed position, which partially encompasses the toothed segment via suitable means and hence restricts the mobility of the lever vertically to the main plane clamped by the bearing structure. The use of a guide plate is a very simple possibility for restricting the mobility of the lever vertically to the main plane clamped by the bearing structure. The use of the guide plate on the lever forces the device to travel along the toothed segment. This enables a defined upward and downward movement of the lever to be set and hence also of the belt deflection fitting.

The guide plate itself is preferably connected to the lever via a welded, rivet, or screwed connection.

A further advantageous development of the invention envisages that the swivelling lever is connected to the latch in a way that is protected against twisting, wherein the latch and the swivelling lever are mounted in a jointly swivelable way in an assigned hole of the lever. This provides structurally simple protection against twisting.

The swivelling lever is preferably connected to the latch such that it is inserted on the continuation of the latch, where it is received in a way that is protected against twisting and connected to a screw in a captive manner.

A further advantageous development of the invention envisages that the latch is provided with guide lugs to the left and right of the latching lug, which guide the latching lug of the latch laterally when it is engaged with a latching contour of the toothed segment. In mounted condition, these guide lugs accept the toothed segment between each other and ensure that the latching lug of the latch is not able to slip off the latching contour of the toothed segment.

A further advantageous development of the invention envisages that the swivelling lever has means for receiving the first eyelet of a tension spring and the lever has on its side facing the swivelling lever means for receiving a second eyelet of the tension spring so that the tension spring can be received by said means under pretension with its two eyelets. Via the mounted swivelling lever, a pivoting of the swivelling lever causes a change in the length of the tension spring, which is suspended by its ends in the swivelling lever on the one hand and in the assigned receiving device on the lever on the other.

The object of the invention is also achieved by a vehicle seat having a bearing structure on which a belt height adjustment device is arranged with the features of claim 9.

One advantageous development of the invention envisages that the belt height adjustment device is arranged in the rear region of the bearing structure such that the swivel axis of the lever stands vertically to the main plane clamped by the bearing structure. This ensures a direct, simple and also frictionless displacement of the belt height adjustment device in the rear region of the bearing structure. As already mentioned above, the belt height adjustment device is intended to provide a defined upward and downward movement of the lever and hence also of the belt deflection fitting.

BRIEF DESCRIPTION OF THE DRAWINGS

Further advantages and details of the invention are explained with reference to the embodiment examples shown in the figures. The figures show in detail.

DETAILED DESCRIPTION THE INVENTION

Figure 1:
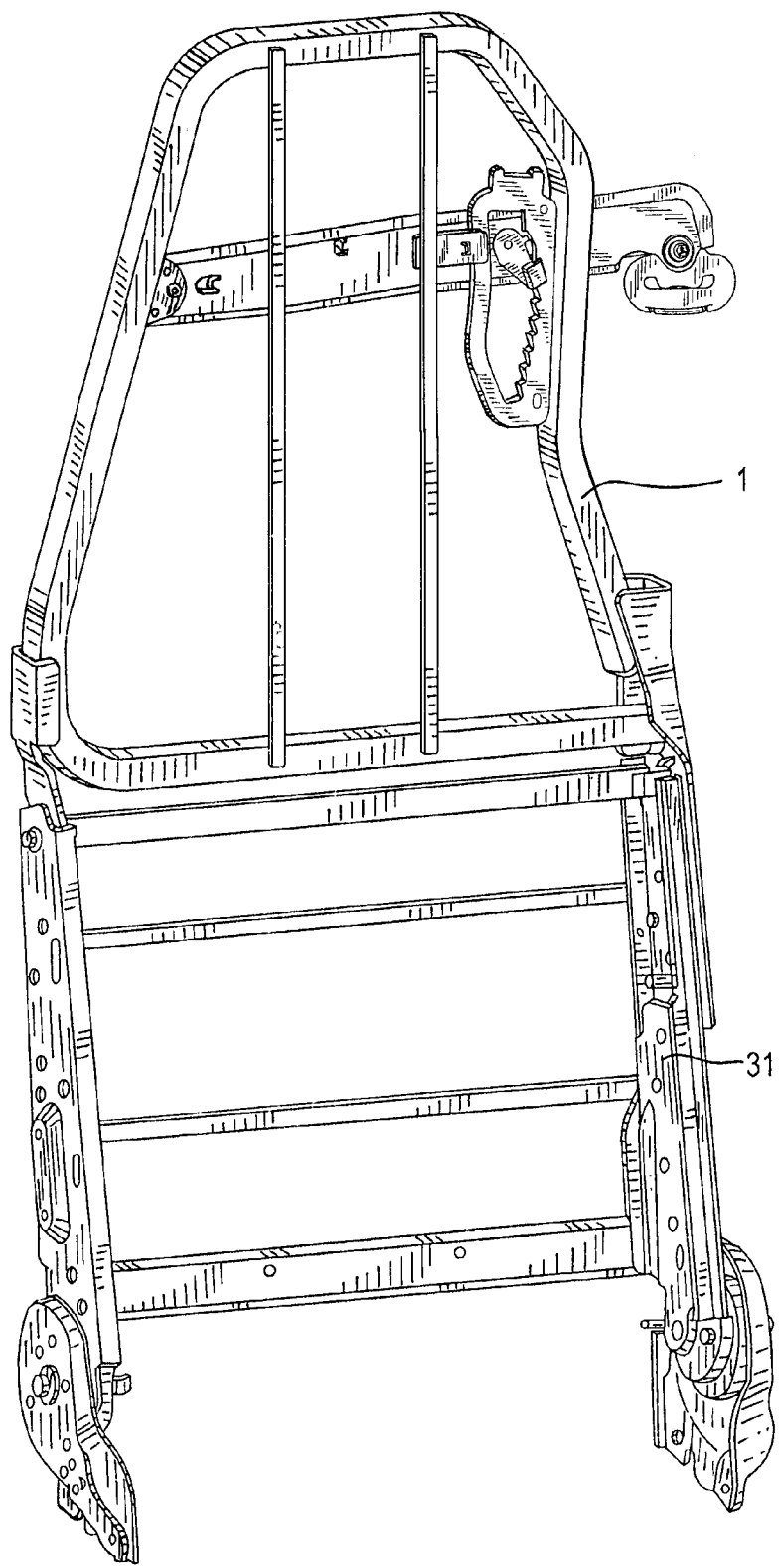
FIG. 1 is a front left-side perspective view of a complete bearing structure of a back frame of a vehicle seat with a belt height adjustment device according to the invention.

FIG. 1 shows a front perspective view of a complete bearing structure of a back frame of a vehicle seat showing the device according to the invention and which also has a shoulder adjustment that is not essential to the invention. The device according to the invention can be used in back frames which have a shoulder adjustment. Similarly, the invention can also be used in back frames which do not have a shoulder adjustment. The bearing structure is divided into an upper bearing structure 1 and a lower bearing structure 31.

Figure 2:
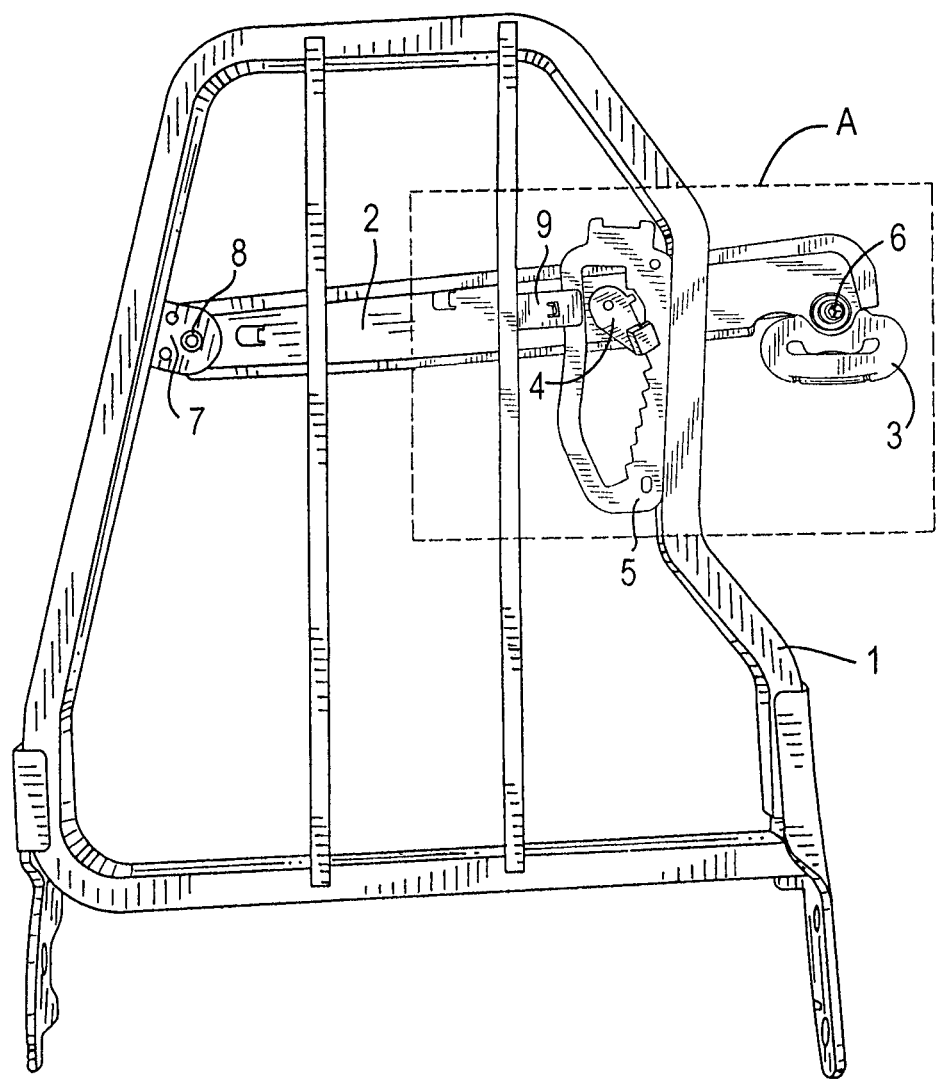
FIG. 2 is a front elevational view of the upper bearing structure of a back frame of a vehicle seat with a belt height adjustment device according to the invention from FIG. 1.

FIG. 2 shows a view of the upper bearing structure 1 of a back frame of a vehicle seat with elements that are essential for the invention.

The belt height adjustment device has a very simple design and substantially consists of the following components: back frame (bearing structure) 1, lever 2, belt deflection fitting 3, latch 4, toothed segment 5, pan-head screw 6, fitting 7, stop screw 8 and guide plate 9.

The bearing structure 1 is part of a vehicle seat backrest.

The fitting 7 is fastened to the bearing structure 1. Here, fastening is provided by means of a welded connection. Other types of connection known to a person skilled in the art, such as, for example, a screwed connection, are possible.

The lever 2 is connected rotatably to the fitting 7 by means of the stop screw 8. The guide plate 9 is further firmly connected to the lever 2 by means of a welded connection. Other types of connection known to a person skilled in the art, such as, for example, a screwed connection, are possible.

The lever 2 is fastened rotatably at its first end on the bearing structure 1 by means of the stop screw 8. The belt deflection fitting 3 is attached to the second end of the lever 2. The second end of the lever 2 protrudes over the bearing structure 1 of the backrest in order in this way to facilitate advantageous belt guidance.

Here, the deflection fitting 3 receives the belt strap in its slot. It is mounted rotatably on the lever 2 by means of a pan-head screw 6.

The guide plate 9 encompasses a toothed segment 5 in order to restrict the degree of freedom of the lever 2 vertically with respect to the bearing structure plane during its pivotal movement around the stop screw 8.

Like the fitting 7, the toothed segment 5 is connected to the bearing structure 1. The fastening is carried out by means of a welded connection. Other types of connection known to a person or ordinary skill in the art are also conceivable. The toothed segment 5 is located on the inner side of the bearing structure 1 lying opposite (substantially lateral to) the fitting 7.

The latch 4 is mounted rotatably in the lever 2 by means of a bearing surface which is moulded-on in one piece. The latch 4 is in operative connection with the toothed segment 5. These two components form the basis of the latching device, to which a swivelling lever 10 and a tension spring 16 also belong (see FIGS. 2 and 3).

Figure 3:
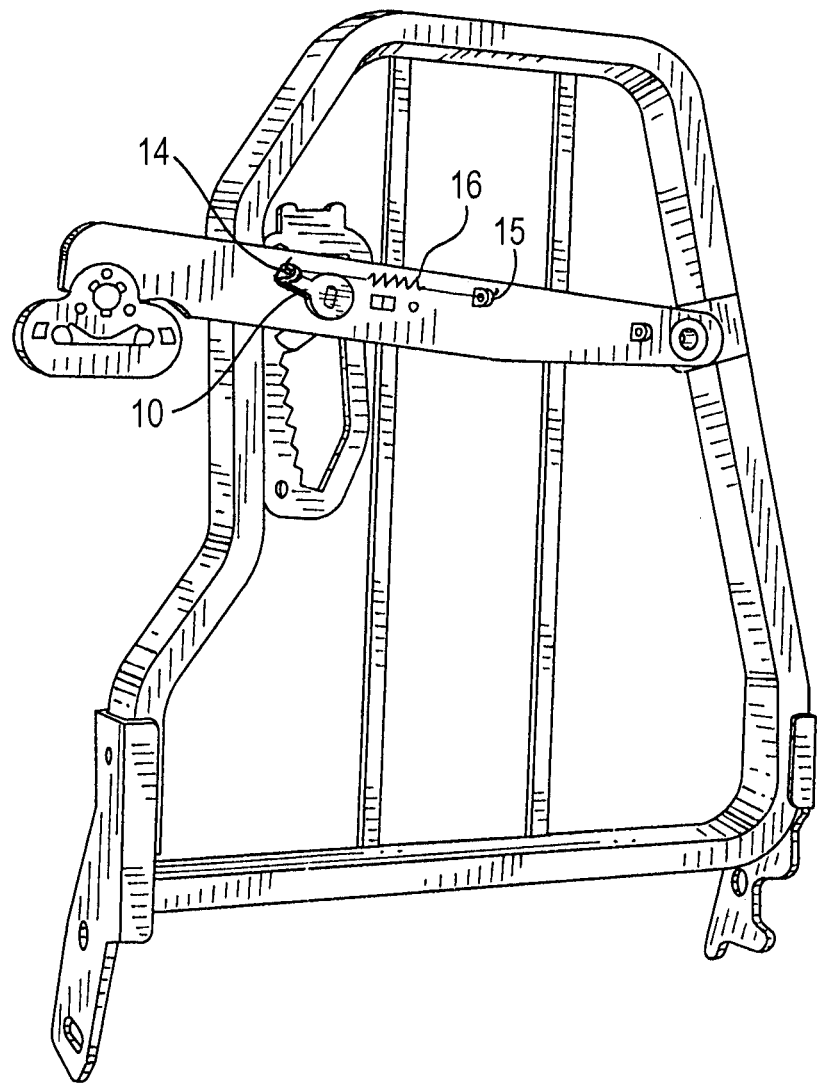
FIG. 3 is a rear perspective view of the upper bearing structure of the back frame of the vehicle seat with the belt height adjustment device according to the invention from FIG. 2.

FIG. 3 shows a rear view of the upper bearing structure of the back frame of the vehicle seat from FIG. 2.

The swivelling lever 10 and the tension spring 16 are arranged on the rear of the lever 2 in a keyed arrangement. The swivelling lever 10 is connected to the latch 4. (The tension spring 16 is shown in simplified form only.)

The swivelling lever 10 has means 27 for receiving a first eyelet 14 of the tension spring 16 and the lever 2 has means 32 for receiving a second eyelet 15 of the tension spring 16 on its side facing the swivelling lever 10 such that the tension spring 16 can be received by said means 27 and 32 under pretension with its two eyelets 14 and 15.

The swivelling lever 10 is inserted on the continuation extending from the rear side of the latch 4, where it is received in a way (keying arrangement) that is protected against twisting and fastened to a screw 33 in a captive manner.

Figure 4:
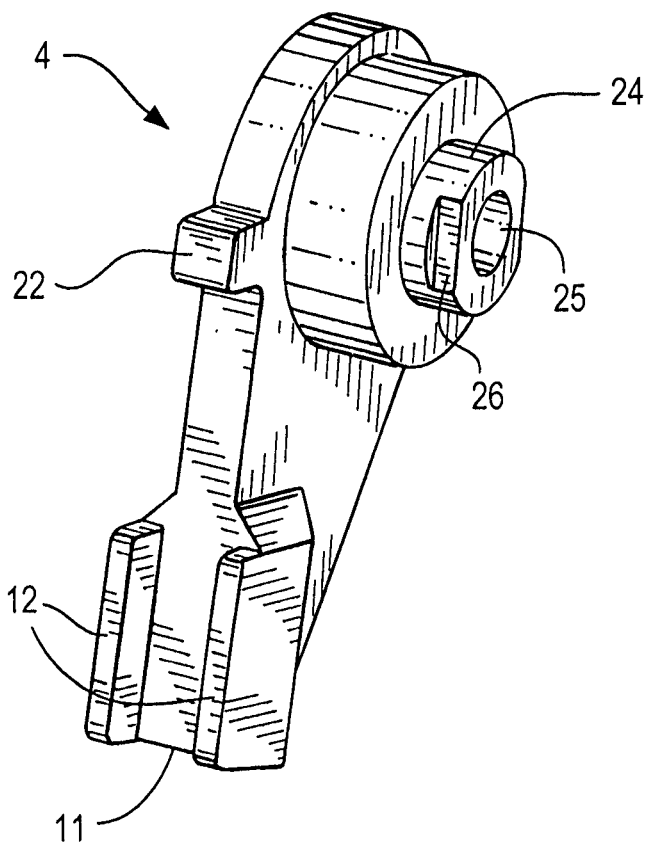
FIG. 4 is an enlarged perspective view of a latch of the belt height adjustment device according to the invention from FIG. 2.

As shown in FIG. 4, in the region of the latching lug 11, the latch 4 has two lateral continuations, the guide lugs 12. In mounted condition, the guide lugs 12 receive the toothed segment 5 between each other and ensure that the latching lug 11 of the latch 4 is not able to slip off the latching contour 13 (FIG. 6) of the toothed segment 5.

Referring to FIG. 3, pivoting of the swivelling lever 10 causes a change (increase) in the length of the spring 16, which is suspended by its ends 14 and 15 between in the swivelling lever 10 on one end and in the assigned receiving device 27 on the rear of the lever 2 on the other end.

Figure 5:
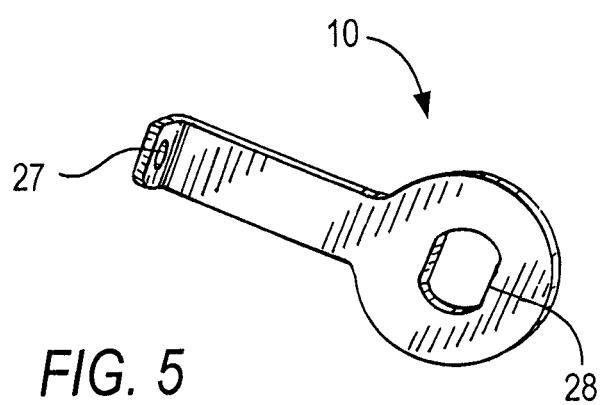
FIG. 5 is an enlarged perspective view of a swivelling lever of the belt height adjustment device according to the invention from FIG. 3.

FIG. 5 shows an enlarged view of the swivelling lever 10 of the belt height adjustment device according to the invention from FIG. 3. The swivelling lever 10 has at one end a receptacle 27 for a spring eyelet 14 and at the other end a mounting hole 28 with protection against twisting (e.g., keying arrangement).

Referring to FIGS. 3-5, the swivelling lever 10 is connected to the latch 4 in a way that is protected against twisting, wherein the latch 4 and the swivelling lever 10 are mounted in a jointly swivellable way in a assigned hole (not shown) of the lever 2. Here, the mounting hole 28 with its protection against twisting matches the swivelling lever receptacle 26, which is arranged on the bearing surface 24 of the fastening thread 25 (FIG. 4).

Figure 6:
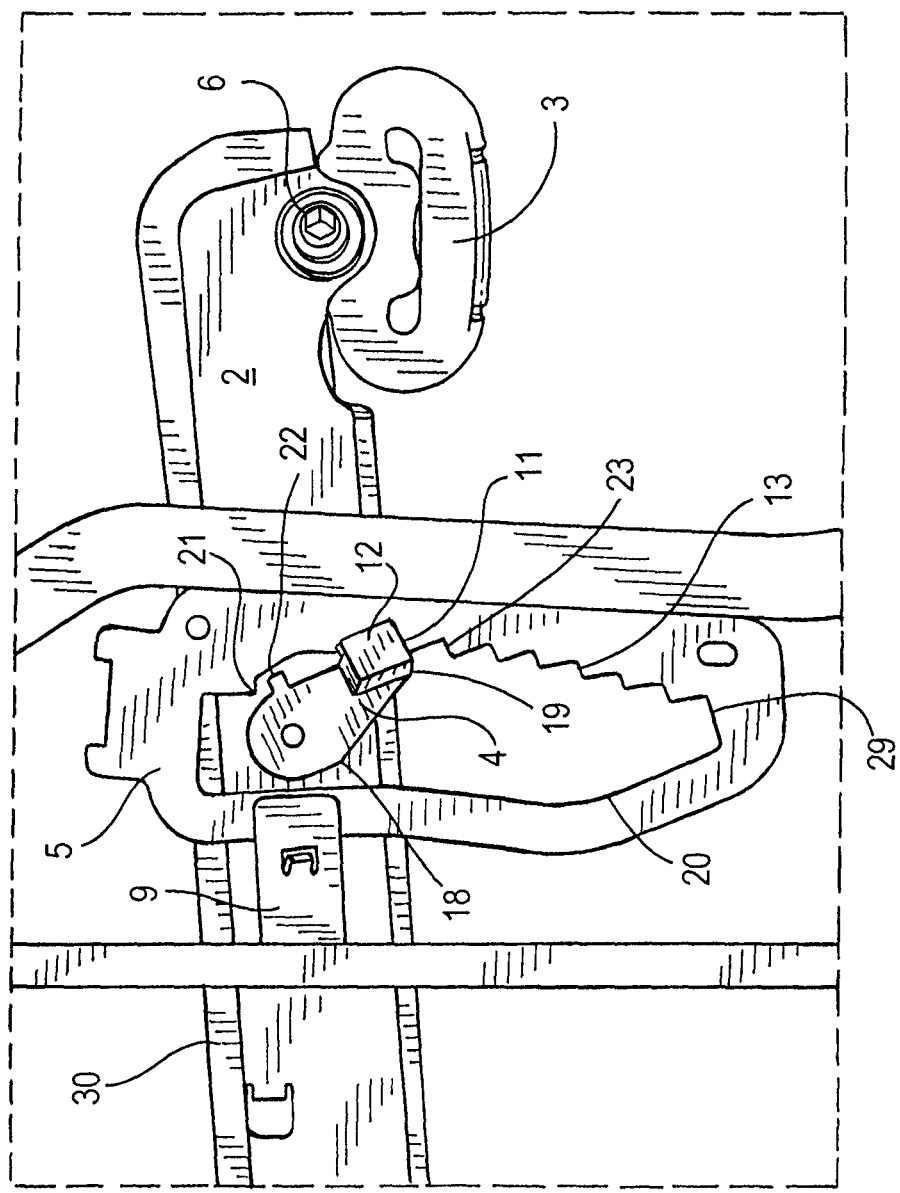
FIG. 6 is an enlarged view of Detail A of FIG. 2 illustrating the belt height adjustment device according to the invention.

The following describes the mode of operation of the belt height adjustment device in more detail with reference in particular to FIG. 6.

FIG. 6 shows a detail A of the belt height adjustment device according to the invention from FIG. 2.

In latched-in condition, the latching lug 11 of the latch 4 lies spring-loaded on one of the latching surfaces 23 of the toothed segment 5. A latching contour 13 is formed from the quantity of all the latching surfaces. A downward change in the height position of the belt deflection fitting 3 is not possible. However, the belt deflection fitting 3 can be brought into a higher position by rotating the lever 2 counter-clockwise.

Whenever the latching position changes, on unlatching, the latch 4 initially executes a small pivotal movement in the clockwise direction and on re-latching it executes a small pivotal movement in the counter-clockwise direction.

If, after reaching the highest latching position, the lever 2 rotates further in the counter-clockwise direction, a control lug 22 of the latch 4 engages with an assigned control corner 21 of the toothed segment 5, which causes a greater swivelling of the latch 4 in the clockwise direction. The swivelling lever 10 is rotated over its reversal point.

The resulting spring force now causes the first freewheeling corner 18 of the latch 4 initially to lie spring-loaded on a freewheeling curve 20 of the toothed segment 5 and travel along said curve on a rotation of the lever 2 about the stop screw 8 in the clockwise direction. (The freewheeling curve 20 is part of the internal contour 29 of the toothed segment 5).

This takes place until the second freewheeling corner 19 of the latch 4 comes to lie on the freewheeling curve 20 of the toothed segment 5. The first freewheeling corner 18 of the latch 4 is now no longer in contact with the freewheeling curve 20 of the toothed segment 5.

The second freewheeling corner 19 of the latch 4 slides along on the freewheeling curve 20 of the toothed segment 5 until the co-swivelling swivelling lever 10 on the rear of the lever 2 has reached its second reversal point.

This causes the spring force to press the latch 4 with its latching lug 11 onto the latching contour of the toothed segment 5 once again. The lowest possible height position of the belt deflection fitting 3 is achieved and from here the lever 2 can be brought back into the desired position and latch on the latching surface.

The belt height adjustment device according to the invention provides a compact unit which is also characterised by a simple technical design and small number of parts and which furthermore can also be operated extremely simply and ergonomically.

While the foregoing is directed to embodiments of the present invention, other and further embodiments of the invention can be devised by those of ordinary skill in the art based on this description without departing from the basic scope thereof, and the scope thereof is determined by the claims that follow.

LIST OF REFERENCE NUMBERS 1 upper bearing structure
2 lever
3 belt deflection fitting
4 latch
5 toothed segment
6 pan-head screw
7 fitting
8 stop screw
9 guide plate
10 swivelling lever 11 latching lug
12 guide lugs
13 latching contour
14 first eyelet
15 second eyelet
16 tension spring
17 pan-head screw
18 first freewheeling corner
19 second freewheeling corner
20 freewheeling curve
21 control corner
22 control lug
23 latching surface
24 bearing surface
25 fastening thread
26 swivelling lever receptacle with anti-twist protection
27 receptacle for spring eyelet
28 mounting hole with anti-twist protection
29 internal contour of the toothed segment
30 cover
31 lower bearing structure

We claim:

1. A seat belt height adjustment device for fixed connection to a bearing structure of a vehicle seat, comprising a lever having a first end and a second end, wherein the first end of the lever is pivotably connected to the bearing structure to provide an axis of rotation of the lever relative to the bearing structure, a belt deflection fitting pivotably connected at the second end and rotatably movable relative to the lever, the lever further including a locking device that selectively prevents pivotal movement of the lever relative to the bearing structure; wherein the locking device is configured to: prevent the pivoting of the lever relative to the bearing structure in a downward direction, engages automatically at predetermined lever angle positions on an upward movement of the lever, and on a further upward movement of the lever, said locking device is deactivated when an upper locking position is exceeded so that the lever is movable to a predetermined structurally lower position without remaining in locking positions; said locking device being formed from a latch and a toothed segment, wherein a first corner portion of the latch is configured to lie spring-loaded on a curved portion of the toothed segment and to travel along said curved portion during rotation of the lever, and during a subsequent upward movement of the lever, the locking device is activated again to prevent downward movement of the lever; and wherein a guide plate is arranged in a fixed position on the lever and configured to partially encompass the toothed segment to restrict movement of the lever to a vertical direction relative to the bearing structure.

2. The seat belt height adjustment device according to claim 1, wherein the latch engages in assigned latching recesses of the toothed segment with spring force loading by a latching lug which is moulded-on in one piece.

3. The seat belt height adjustment device of claim 1, wherein the lever is connected via a fitting which is firmly connected to the bearing structure and which functions as a holding element for a stop screw, wherein the lever is rotatably mounted on the fixture by the stop screw.

4. The seat belt height adjustment device of claim 3, wherein swivel axis of the lever is defined by a central axis of the stop screw which is positioned at the first end of the lever.

5. The seat belt height adjustment device of claim 2, further comprising a swivelling lever fixedly connected to the latch in a fixed position, wherein at least one of the latch and the swivelling lever has a portion extending through an opening formed in the lever to enable joint rotation of the fixedly connected swivelling lever and latch.

6. The seat belt height adjustment device according to claim 5, wherein the latching lug of the latch includes guide lugs which guide the latching lug (11) laterally when engaging a latching contour of the toothed segment.

7. The seat belt height adjustment device according to claim 6, wherein the swivelling lever has means for receiving a first eyelet of a tensioning spring and the lever has on its side facing the swivelling lever means for receiving a second eyelet of the tensioning spring so that the tensioning spring is secured under pretension.

8. A vehicle seat with a bearing structure on which a seat belt height adjustment device according to claim 1 is attached.

9. The vehicle seat according to claim 8 wherein the seat belt height adjustment device is arranged on a rear facing portion of the bearing structure such that a swivel axis of the lever enables the belt deflection fitting to move substantially vertically with respect to the bearing structure.

10. The seat belt height adjustment device according to claim 6, further comprising a tensioning spring for selectively rotating and engaging the latch with the toothed segment, wherein the swivelling lever is configured to receive a first end of the tensioning spring and the lever is configured on its side facing the swivelling lever to receive a second end of the tensioning spring.

* * * * *